# 3,121,716
PYRAZINAMIDE AND DERIVATIVES THEREOF
Shigeru Yoshida and Motoji Asai, both % Shinagawa Factory, Sankyo Co., Ltd., 888 1-chome Nishishinagawa, Shinagawa-ku, Tokyo, Japan
No Drawing. Filed Sept. 6, 1960, Ser. No. 53,896
6 Claims. (Cl. 260—250)

This invention relates to new pyrazine derivatives and a method of preparing thereof. More particularly, it relates ot novel pyrazine derivatives having the general formula

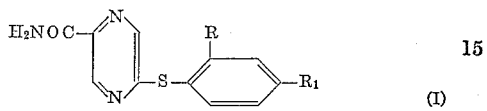
(I)

wherein R represents a member of the group consisting of hydrogen and carboxyl and $R_1$ represents a member of the group consisting of hydrogen, methyl, amino and acetylamino when R is hydrogen and hydrogen when R is carboxyl, the general formula

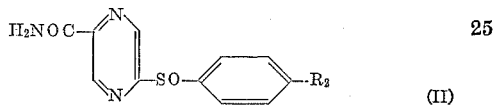
(II)

wherein $R_2$ is a member of the group consisting of hydrogen and methyl, and the general formula

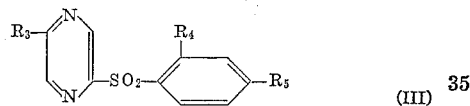
(III)

wherein $R_3$ represents a member of the group consisting of carbamoyl ($H_2NOC-$) and cyano, $R_4$ represents hydrogen when $R_3$ is cyano and a member of the group consisting of hydrogen and carboxyl when $R_3$ is carbamoyl and $R_5$ represents hydrogen when $R_4$ is cyano and $R_4$ is hydrogen and when $R_3$ is carbamoyl and $R_4$ is carboxyl and a member of the group consisting of hydrogen, methyl and acetylamino when $R_3$ is carbamoyl and $R_4$ is hydrogen which are useful as antituberculous agent and method of preparing thereof.

Pyrazinamide is the only pyrazine derivative hitherto used as antituberculous agent, but it is now desired to obtain pyrazine compounds with more potent antituberculous activity and lower toxicity. As a result of studies searching for an agent having potent antituberculous activity, we have found that the pyrazine derivatives of the above-mentioned general Formulas I, II and III have antituberculous activity superior to that of pyrazinamide.

It is the object of this invention to provide such pyrazine derivatives having high antituberculous activity and a method of preparing same.

Compounds included in the pyrazine derivatives of this invention having the above-mentioned general Formulas I, II and III are individually shown as follows:

(1) 2-phenylthio-5-carbamoylpyrazine

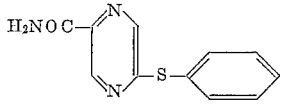

(2) 2-p-methylphenylthio-5-carbamoylpyrazine

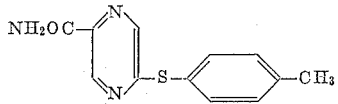

(3) 2-o-carboxyphenylthio-5-carbamoylpyrazine

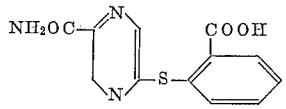

(4) 2-p-aminophenylthio-5-carbamoylpyrazine

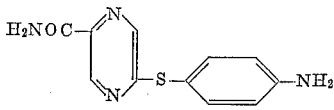

(5) 2-p-acetylaminophenylthio-5-carbamoylpyrazine

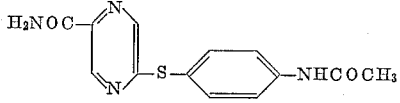

(6) 2-phenylsulfinyl-5-carbamoylpyrazine

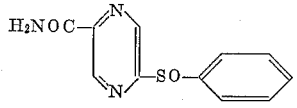

(7) 2-p-methylphenylsulfinyl-5-carbamoylpyrazine

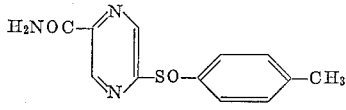

(8) 2-phenylsulfonyl-5-cyanopyrazine

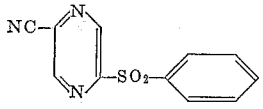

(9) 2-phenylsulfonyl-5-carbamoylpyrazine

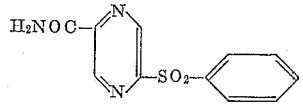

(10) 2-p-methylphenylsulfonyl-5-carbamoylpyrazine

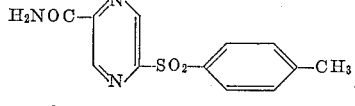

(11) 2-o-carboxyphenylsulfonyl-5-carbamoylpyrazine

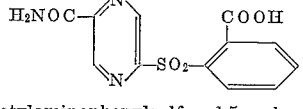

(12) 2-p-acetylaminophenylsulfonyl-5-carbamoylpyrazine

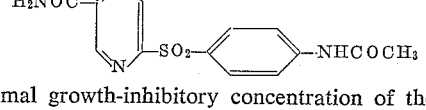

Minimal growth-inhibitory concentration of the pyrazine derivatives of this invention against *Mycobacterium tuberculosis* $H_{37}Rv$ is shown below in comparison with that of pyrazinamide.

Strain employed: *Mycobacterium tuberculosis* $H_{37}Rv$.
Medium used: Kirchner medium containing 10% serium albumin.
Method: The test solution is prepared by serial dilution of the test agent in propylene glycol with distilled water in such a way that the concentration of the test agent is from 0.006 mcg. to 100 mcg. per cc. of the medium. The concentration of propylene glycol in the medium is less than 2.5%. The antituberculous activity is determined after incubating at 37° C. for 4 weeks.

Result:

Name of compound—

| | Minimal inhibitory concentration [1] |
|---|---|
| 2-phenylthio-5-carbamoylpyrazine | 1.56 |
| 2-p-methylphenylthio-5-carbamoylpyrazine | 25 |
| 2-o-carboxyphenylthio-5-carbamoylpyrazine | 50 |
| 2-p-aminophenylthio-5-carbamoylpyrazine | 25 |
| 2-p-acetylaminophenylthio-5-carbamoylpyrazine | 50 |
| 2-phenylsulfinyl-5-carbamoylpyrazine | [2] 100 |
| 2-p-methylphenylsulfinyl-5-carbamoylpyrazine | 50 |
| 2-phenylsulfonyl-5-cyanopyrazine | 1.56 |
| 2-phenylsulfonyl-5-carbamoylpyrazine | 100 |
| 2-p-methylphenylsulfonyl-5-carbamoylpyrazine | 50 |
| 2-o-carboxyphenylsulfonyl-5-carbamoylpyrazine | 50 |
| 2-p-acetylaminophenylsulfonyl-5-carbamoylpyrazine | 50 |
| Pyrazinamide | >100 |

[1] In mcg./cc. of medium.
[2] Growth was ± at that concentration.

The compounds of this invention are of low toxicity. Intravenous injection of any pyrazine derivative of this invention at a dose as much as 15 mg./10 g. bodyweight of mouse does not cause death of the animal. This indicates that these pyrazine derivatives are not more toxic than pyrazinamide.

According to the present invention, the pyrazine derivatives of the general Formulas I, II and III may be prepared by the following method:

PYRAZINE DERIVATIVES OF THE GENERAL FORMULA I

Condensation of pyrazine derivatives of the general formula

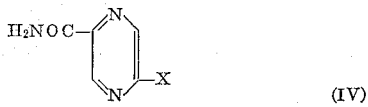

(IV)

wherein X is a member of the group consisting of chlorine and bromine with a thiophenol derivative of the general formula

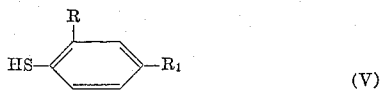

(V)

wherein R is a member of the group consisting of hydrogen and carboxyl and $R_1$ is a member of the group consisting of hydrogen, methyl, amino and acetylamino when R is hydrogen and hydrogen when R is carboxyl in the presence of sodium alcoholate gives compounds of the general Formula I.

In carrying out the above-mentioned reaction in practice, to an alcohol solution containing sodium alcoholate prepared by adding metallic sodium to a lower alcohol such as methyl, ethyl or propyl alcohol is added a thiophenol derivative of the general Formula V, followed by addition of a pyrazine derivative of the general Formula IV. The reaction mixture is heated at temperature from about 50° C. to the refluxing temperature for a period of time from about 1 hour to 3 hours to complete the reaction. The desired reaction product may be isolated from the reaction mixture after completion of the reaction by a conventional means. For example, if the compound of the general Formula I in which R is carboxyl and $R_1$ is hydrogen (2-o-carboxyphenylthio-5-carbamoylpyrazine) is the desired product, the alcohol is distilled off after completion of the reaction, the residue is dissolved in water, followed by addition of a mineral acid, and the precipitates thus formed are separated by filtration, which are the desired product. If compounds of the general Formula I other than 2-o-carboxyphenylthio-5-carbamoylpyrazine are the desired products, the reaction mixture after completion of the reaction is cooled, water is added if necessary and the precipitates thus formed are separated by filtration, which are the desired product.

The products thus obtained may be recrystallized from water, alcohols or alqueous alcohols.

PYRAZINE DERIVATIVES OF THE GENERAL FORMULA II

Pyrazine derivatives of the above-mentioned general Formula IV are condensed with a thiophenol derivative of the general formula

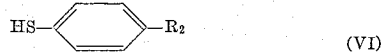

(VI)

wherein $R_2$ is a member of the group consisting of hydrogen and methyl in the presence of sodium alcoholate to give pyrazine derivatives of the general formula

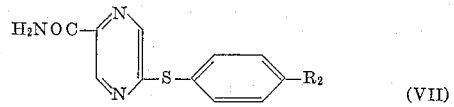

(VII)

wherein $R_2$ is same as above, which are oxidized by one of the known methods usually employed for conversion of —S— to —SO— to obtain compounds of the general Formula II. Thus, hydrogen peroxide or potassium permanganate may be used as oxidizing agents.

The above-described reactions may be practically effected by carrying out the former procedure in the same way as in obtaining the compounds of the general Formula I, and after completion of the reaction, cooling the reaction mixture followed by, if necessary, addition of water thereto and separation of the precipitates by filtration.

Then, the compounds of the general Formula VII are subjected to an oxidation reaction by the use of one of the known methods for converting —S— to —SO—, such as for example, with hydrogen peroxide or potassium permanganate to transform them into pyrazine compounds of the general Formula II. The hydrogen peroxide or the potassium permanganate should preferably be employed in a slight excess equimolar amount relative to the above mentioned sulfinyl compound.

This process may be, for example, preferably carried out by the procedures described below. A pyrazine derivative of general Formula VII and hydrogen peroxide in an amount sufficient to transform pyrazine derivatives of the general Formula VII into pyrazine derivatives of the general Formula II (in a slight excess of equimolar amount to compounds of the general Formula VII) are added to glacial acetic acid and the mixture is subjected to reaction by stirring at a temperature between about 50° C. and 70° C. for a period of time between about 30 min. and an hour. After completion of the reaction, the reaction mixture is cooled, followed by, if necessary, addition of water, and the precipitates thus formed are separated by filtration. The reaction product thus obtained may be purified by recrystallization from water, alcohols or aqueous alcohols.

PYRAZINE DERIVATIVES OF THE GENERAL FORMULA III

Pyrazine derivatives of the general formula

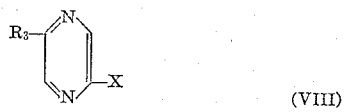

(VIII)

wherein $R_3$ represents a member of the group consisting of carbamoyl ($H_2NOC$—) and cyano and X represents a member of the group consisting of chlorine and bromine are condensed with a thiophenol derivative of the general formula

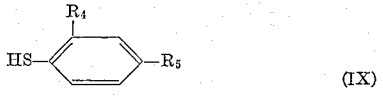

(IX)

wherein $R_4$ represents hydrogen when $R_3$ is cyano and a member of the group consisting of hydrogen and carboxyl when $R_3$ is carbamoyl and $R_5$ represents hydrogen when $R_3$ is cyano and $R_4$ is hydrogen and when $R_3$ is carbamoyl and $R_4$ is carboxyl and a member of the group consisting of hydrogen, methyl and acetylamino when $R_3$ is carbamoyl and $R_4$ is hydrogen in the presence of sodium alcoholate to obtain compounds of the general formula

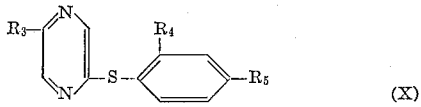

(X)

wherein $R_3$, $R_4$ and $R_5$ are same as above, which are oxidized by one of the known methods usually used for conversion of —S— to —$SO_2$— to give compounds of the general Formula III. Thus, hydrogen peroxide or potassium permanganate may be used as oxidizers.

The former step of the above-mentioned reactions may be carried out by the same procedure used in the preparation of compounds of the general Formula I.

Next, the compounds of the general formula X may be transformed into pyrazine derivatives of the general Formula III by the same method as described above in the preparation of the compounds of the general Formula II but using hydrogen peroxide or potassium permanganate in a slight excess of twice the molar amount relative to the sulfinyl compound.

This process may be, for example, preferably carried out by the procedures described below. A pyrazine derivative of the general Formula X and hydrogen peroxide in an amount sufficiently to transform pyrazine derivatives of the general Formula X into pyrazine derivatives of the general Formula III (in a slightly excess of equimolar amount to compounds of the general Formula X) are added to glacal acetic acid and the mixture is subjected to reaction by stirring at a temperature between about 50° C. and 70° C. for a period of time between about 30 min. and an hour. After completion of the reaction, the reaction mixture is cooled, followed by, if necessary, addition of water, and the precipitates thus formed are separated by filtration. The reaction product thus obtained may be purified by recrystallization from water, alcohols or aqueous alcohols.

2-chloro-5-cyanopyrazine and 2-bromo-5-carbamoylpyrazine used as starting material in the process according to the present invention may be prepared as follows:

A mixture of 3-carbamoylpyrazine-1-oxide and phosphorus oxychloride (or oxybromide) is refluxed for about 1–2 hours, excess of the phosphorus oxychloride (or oxybromide) distilled off in vacuum, the residue poured onto ice for decomposition and the resulting mixture immediately extracted with ether. The extract is washed with water, aqueous solution of sodium carbonate and again with water and dried over sodium sulfate. Removal of the ether by distillation and subsequent vacuum distillation of the residue gives 2-chloro-5-cyanopyrazine (or 2-bromo-cyanopyrazine).

The 2-chloro-5-cyanopyrazine (or 2-bromo-5-cyanopyrazine) thus obtained is mixed with concentrated hydrochloric acid in an amount 2–3 times as much followed by stirring to precipitate which crystals gradually. After allowed to stand overnight, the precipitates are separated by filtration, washed with water and recrystallized from aqueous alcohol to yield 2-chloro-5-carbamoylpyrazine (or 2-bromo-5-carbamoylpyrazine).

The following examples illustrate the present invention. However, it should be understood that these examples may be illustrative but not limit the scope of this invention.

Example 1

2-PHENYLTHIO-5-CARBAMOYLPYRAZINE

To a solution of 0.7 g. of metallic sodium in 15 ml. of absolute ethanol are added 3.3 g. of thiophenol and 4.7 g. of 2-chloro-5-carbamoylpyrazine. The mixture is heated on steam bath for 3 hours. The reaction mixture is then cooled to precipitate white crystals, which are separated by filtration, washed with water and recrystallized from ethanol. Colorless plates. Yield 6.1 g., M.P. 171–172° C. Analysis.—Found: C, 57.34; H, 3.68; N, 18.34. Calcd. for $C_{11}H_9ON_3S$: C, 57.14; H, 3.90; N, 18.18.

Example 2

2-p-METHYLPHENYLTHIO-5-CARBAMOYLPYRAZINE

To a solution of 0.46 g. of metallic sodium in 10 ml. of absolute alcohol are added 2.3 g. of p-methylthiophenol and 3.15 g. of 2-chloro-5-carbamoylpyrazine. The mixture is heated under reflux on steam bath for 2 hours, followed by cooling to precipitate white crystals. The crystals are separated by filtration, washed with water and recrystallized from ethanol. Colorless plates. Yield 4.1 g., M.P. 169–170° C. Analysis.—Found: C, 58.97; H, 4.34; N, 16.93. Calcd. for $C_{12}H_{11}ON_3S$: C, 58.78; H, 4.49; N, 17.14.

Example 3

2-o-CARBOXYPHENYLTHIO-5-CARBAMOYLPYRAZINE

To a solution of 0.9 g. of metallic sodium in 70 ml. of absolute ethanol are added 2.8 g. of thiosalicyclic acid and 2.8 g. of 2-chloro-5-carbamoylpyrazine, followed by heating for 5 hours. After completion of the reaction, the alcohol is distilled off in vacuum, the residue dissolved in water, and following separation of the undissolved matter, the filtrate acidified to precipitate crystalline 2-o-carboxyphenylthio-5-carbamoylpyrazine. Yield 4.5 g. Recrystallization from methanol gives pale yellow prisms melting at 227–228° C. Analysis.—Found: C, 52.61; H, 3.07; N, 15.07. Calcd. for $C_{12}H_9O_3N_3S$: C, 52.36; H, 3.27; N, 15.27.

Example 4

2-p-AMINOPHENYLTHIO-5-CARBAMOYLPYRAZINE

To a solution of 0.92 g. of metallic sodium in 60 ml. of absolute ethanol are added 5 g. of p-aminothiophenol and 6 g. of 2-chloro-5-carbamoylpyrazine. The mixture is heated on steam bath for 3 hours. Cooling gives rise to precipitation of crystalline 2-p-aminophenylthio-5-carbamoylpyrazine, which is separated by filtration, washed with water and recrystallized from ethanol. Yellow needles. M.P. 168° C. Yield 7.0 g. Analysis.—Found: C, 53.76; H, 3.88; N, 22.48. Calcd. for $C_{11}H_{10}ON_4S$: C, 53.65; H, 4.07; N, 22.76.

Example 5

2-p-ACETAMINOPHENYLTHIO-5-CARBAMOYLPYRAZINE

One gram of 2-p-aminophenylthio-5-carbamoylpyrazine is mixed with 4 ml. of acetic anhydride. Exothermic reaction occurs. The mixture is heated on steam bath for additional 30 min., followed by cooling to precipitate crystals. The crystals are separated by filtration and recrystallized from aqueous ethanol to give 0.9 g. of pale yellow amorphous solid melting at 220–221° C. with decomposition. Analysis.—Found: C, 54.30; H, 4.36; N, 19.46. Calcd. for $C_{13}H_{12}O_2N_4S$: S, 54.17; H, 4.17; N, 19.44.

Example 6

2-PHENYLSULFINYL-5-CARBAMOYLPYRAZINE

A mixture of 1 g. of 2-phenylthio-5-carbamoylpyrazine, 3 ml. of glacal acetic acid and 3 ml. of 30% hydrogen peroxide is heated at 45–50° C. with stirring for an hour. After cooling the reaction mixture is poured into water to precipitate white crystals, which are separated by filtration and recrystallized from water. White amorphous solid melting at 168° C. is obtained in a yield of 0.9 g. Analysis.—Found: C, 53.33; H, 3.67; N, 16.78. Calcd. for $C_{11}H_9O_2N_3S$: C, 53.44; H, 3.64; N, 17.00.

Example 7

2-p-METHYLPHENYLSULFINYL-5-CARBAMOYLPYRAZINE

A suspension of 1 g. of 2-p-methylphenylthio-5-carbamoylpyrazine in 3 ml. of glacial acetic acid and 3 ml. of 30% hydrogen peroxide is heated at 45–50° C. with stirring for 1.5 hours. After cooling, the reaction mixture is poured into water to precipitate white crystals, which are separated by filtration and recrystallized from water. White leaves melting at 201° C. are obtained in a yield of 1.0 g. Analysis—Found: C, 55.19; H, 4.43; N, 15.99. Calcd. for $C_{12}H_{11}O_2N_3S$: C, 55.17; H, 4.21; N, 16.09.

Example 8

2-PHENYLSULFONYL-5-CYANOPYRAZINE

To a solution of 0.2 g. of metallic sodium in 5 ml. of absolute ethanol are added 1.1 g. of thiophenol and 1.4 g. of 2-chloro-5-cyanopyrazine. Vigorous exothermic occurs. After heating on steam bath for about an hour, the alcohol is distilled off, the residue mixed with aqueous solution of sodium hydroxide. The resulting mixture is extracted with ether, the extract dried and subjected to vacuum distillation. The distillate, B.P. 150–170° C./0.05 mm. Hg, solidifies on standing; 2-phenylthio-5-cyanopyrazine; M.P. 72° C.; yield 1.5 g.

A solution of 1 g. of 2-phenylthio-5-cyanopyrazine in 4 ml. of glacial acetic acid and 10 ml. of 30% hydrogen peroxide is heated at about 50° C. for 3 hours. When allowed to col, white crystals are precipitated from the resulting reaction mixture, which are recrystallized from aqueous ethanol to give 0.6 g. of colorless plates of the desired product melting at 127° C. Analysis.—Found: C, 53.61; H, 2.68; N, 17.29. Calcd. for $C_{11}H_7O_2N_3S$: C, 53.88; H, 2.86; N, 17.14.

Example 9

2-PHENYLSULFONYL-5-CARBAMOYLPYRAZINE

A suspension of 1 g. of 2-phenylthio-5-carbamoylpyrazine in 5 ml. of glacial acetic acid and 5 ml. of 30% hydrogen peroxide is heated at 55–60° C. with stirring for 4 hours. After cooling, the reaction mixture is poured into water and the crystals precipitated are separated by filtration. Recrystallization from aqueous methanol gives 1.0 g. of colorless needles melting at 164–165° C. Analysis.—Found: C, 50.48; H, 3.18; N, 16.06. Calcd. for $C_{11}H_9O_3N_3S$: C, 50.19; H, 3.42; N, 15.97.

The same result is obtained if 2-phenylsulfinyl-5-carbamoylpyrazine is used in place of 2-phenylthio-5-carbamoylpyrazine.

Example 10

2-p-METHYLPHENYLSULFONYL-5-CARBAMOYL-PYRAZINE

A suspension of 1 g. of 2-p-methylphenylthio-5-carbamoylpyrazine in 5 ml. of glacial acetic acid and 5 ml. of 30% hydrogen peroxide is heated at 55–60° C. with stirring for 4 hours. After cooling, white crystals are precipitated from the reaction mixture, which are separated by filtration and recrystallized from aqueous ethanol to give 1.0 g. of colorless needles melting at 192–194° C. Analysis.—Found: C, 51.84; H, 3.42; N, 15.36. Calcd. for $C_{12}H_{11}O_3N_3S$: C, 51.99; H, 3.97; N, 15.17.

The same result is obtained when 2-p-methylphenylsulfinyl-5-carbamoylpyrazine is used in place of 2-p-methylphenylthio-5-carbamoylpyrazine.

Example 11

2-p-CARBOXYPHENYLSULFONYL-5-CARBAMOYL-PYRAZINE

A suspension of 0.8 g. of 2-o-carboxyphenylthio-5-carbamoylpyrazine in 4 ml. of glacial acetic acid and 4 ml. of 30% hydrogen peroxide is heated at about 50° C. with stirring for 2 hours. After cooling, crystals are precipitated from the reaction mixture, which are separated by filtration and recrystallized from aqueous alcohol to give 0.6 g. of white prisms melting at 173–174° C. Analysis.—Found: C, 46.62; H, 3.01; N, 13.46. Calcd. for $C_{12}H_9O_5S_3$: C, 46.91; H, 2.93; N, 13.68.

Example 12

2-p-ACETYLAMINOPHENYLSULFONYL-5-CARBAMOYLPYRAZINE

A suspension of 1 g. of 2-p-acetaminophenylthio-5-carbamoylpyrazine in 5 ml. of glacial acetic acid and 5 ml. of 30% hydrogen peroxide is heated on steam bath at 30–55° C. for 2 hours. After cooling, crystals are precipitated from the reaction mixture, which are separated by filtration and recrystallized from aqueous ethanol to give 0.8 g. of colorless needles melting at 269–270° C. with decomposition. Analysis.—Found: C, 48.69; H, 3.96; N, 17.34. Calcd. for $C_{13}H_{12}O_4N_4S$: C, 48.75; H, 3.75; N, 17.50.

We claim:

1. Compounds having the formula

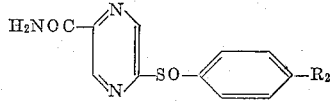

wherein $R_2$ represents a member of the group consisting of hydrogen and methyl.

2. 2-o-carboxyphenylthio-5-carbamoylpyrazine

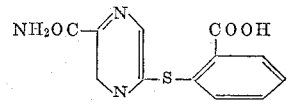

3. 2-phenylsulfinyl-5-carbamoylpyrazine

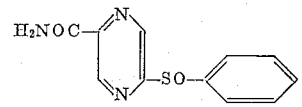

4. 2-o-carboxyphenylsulfonyl-5-carbamoylpyrazine

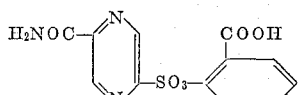

5. Compounds having the formula

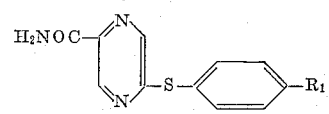

wherein $R_1$ represents a member selected from the group consisting of hydrogen, methyl, amino and acetylamino.

6. Compounds having the formula

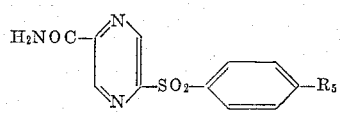

wherein $R_5$ represents a member of the group consisting of hydrogen, methyl and acetylamino.

References Cited in the file of this patent

Gregory et al.: J. Chem. Soc., London (1949), pages 2066–9.

Wolf et al.: J. Amer. Chem. Soc., volume 76 (1954), page 2266.